(12) United States Patent
Richards

(10) Patent No.: US 6,406,301 B2
(45) Date of Patent: *Jun. 18, 2002

(54) CLOCK TEACHING AID

(76) Inventor: John Michael Richards, Spike Lodge, The Street, East Preston, Littlehampton BN16 1JL (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/506,291

(22) Filed: Feb. 18, 2000

(30) Foreign Application Priority Data

Feb. 19, 1999 (GB) .............................................. 9903933

(51) Int. Cl.$^7$ ................................................ G09B 19/12
(52) U.S. Cl. ......................................... 434/304; 368/63
(58) Field of Search ................................ 434/304, 394; 368/63, 223, 276, 281, 301

(56) References Cited

U.S. PATENT DOCUMENTS

| | | | | |
|---|---|---|---|---|
| 3,702,507 A | * | 11/1972 | Romey | 434/304 |
| 4,102,060 A | * | 7/1978 | Berry | 434/304 |
| 4,219,943 A | * | 9/1980 | Grimes | 434/304 |
| 4,370,063 A | * | 1/1983 | Lee | 368/71 |
| 5,422,864 A | * | 6/1995 | Lorello | 368/223 |

* cited by examiner

Primary Examiner—Jacob K. Ackun
Assistant Examiner—Bena B. Miller
(74) Attorney, Agent, or Firm—Diller, Ramik & Wight

(57) ABSTRACT

A teaching device adapted to teach the reading of an analogue clock face comprising first and second components one of which is transparent, one of said components being marked to represent a clock face displaying minutes and on which a minute clock had can be manually rotated and the other of said components being marked to represent a clock face displaying hours and on which an hour clock hand can be manually rotated, and means for removably connecting said first and second components together with said minute and hour clock face superimposed one above the other to display a complete analogue clock face showing hours and minutes and having hour and minute hands.

9 Claims, 2 Drawing Sheets

CLOCK TEACHING AID

BACKGROUND OF THE INVENTION

Teaching children how to read an analogue clock can be quite difficult because of the different motions of the minute and hour hands during a 12-hour cycle. The present invention hopes to make the job of teaching this movement easier by separating the two different movements of the hour and minute hand, and then bringing them together again.

SUMMARY OF THE INVENTION

According to the present invention a teaching device adapted to teach the reading of an analogue clock face comprises first and second components one of which is transparent, one of said components being marked to represent a clock face displaying minutes and on which a minute clock hand can be manually rotated and the other of said components being marked to represent a clock face displaying hours and on which an hour clock hand can be manually rotated, and means for removably connecting said first and second components together with said minute and hour clock face superimposed one above the other to display a complete analogue clock face showing hours and minutes and having hour and minute hands.

The first component can be transparent and have a clock face displaying hours or alternatively the second component can be transparent and have a clock face displaying minutes.

In a preferred construction each of said first and second components carries its respective clock face on a face surface of a supporting wall, said supporting walls being spaced apart from each other with said face surfaces facing each other when the first and second components are removably connected together.

Said hour and minute hands can be located on said respective clock faces and said means for manual operation thereof can be arranged on the surfaces of said supporting walls which face away from each other.

In a preferred construction said first and second components are shaped to form a casing when connected together with the clock faces and respective hour and minute hands within the casing and the means for manual operation of the hour and minute hands outside the casing.

The means for removably connecting the first and second component together can act to prevent relative rotation and ensure that they are correctly located.

The clock face displaying hours and the hour hand can be of a different colour from the clock face displaying minutes and the minute hand.

Additionally the face showing the minutes can be marked to indicate "to" and "past" the hour. Thus it can be divided into halves along a line extending between the numerals thirty and sixty. It can be defined by areas of colour. If desired the "to" and "past" the hour can be indicated by arrows.

The invention can be of any reasonable size but is preferably constructed so as to fit into a pocket.

The present invention can be performed in various ways and one embodiment will now be described by way of example and with reference to the accompanying drawings in which:

DESCRIPTION OF THE PREFERRED EMBODIMENTS

Figure 1:
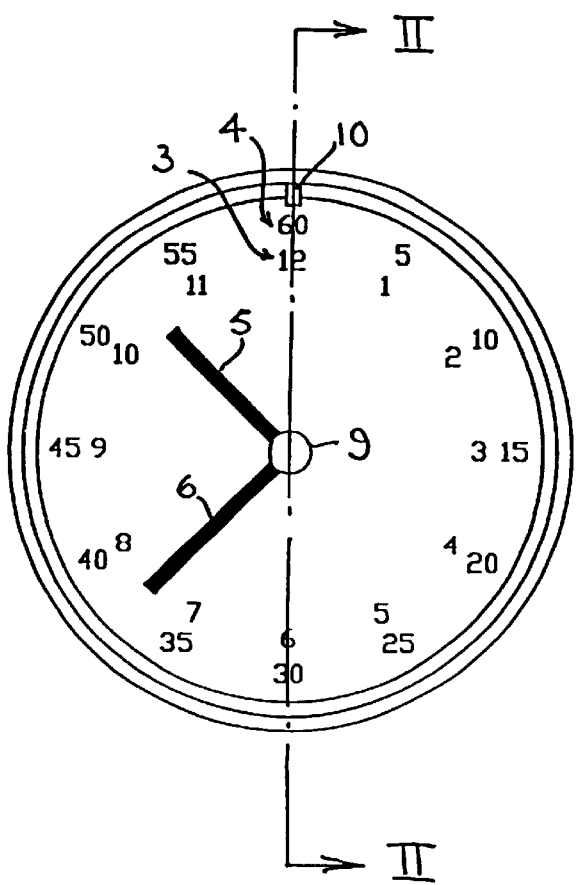
FIG. 1 is a front view of the of the invention.
Figure 2:
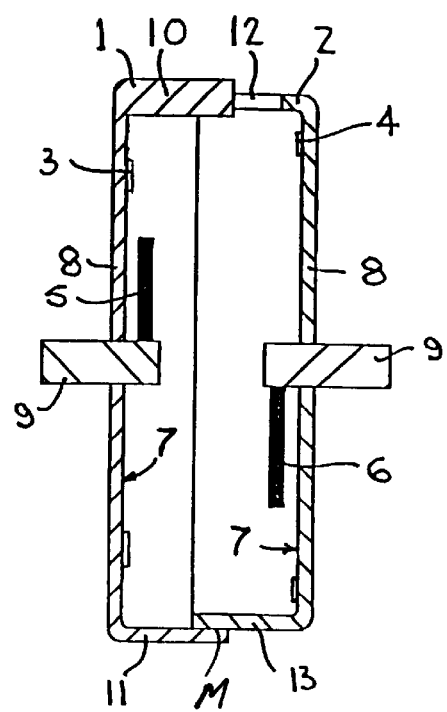
FIG. 2 is a cross-sectional side view of the of the invention as seen in FIG. 1 on the line II—II.
Figure 3:
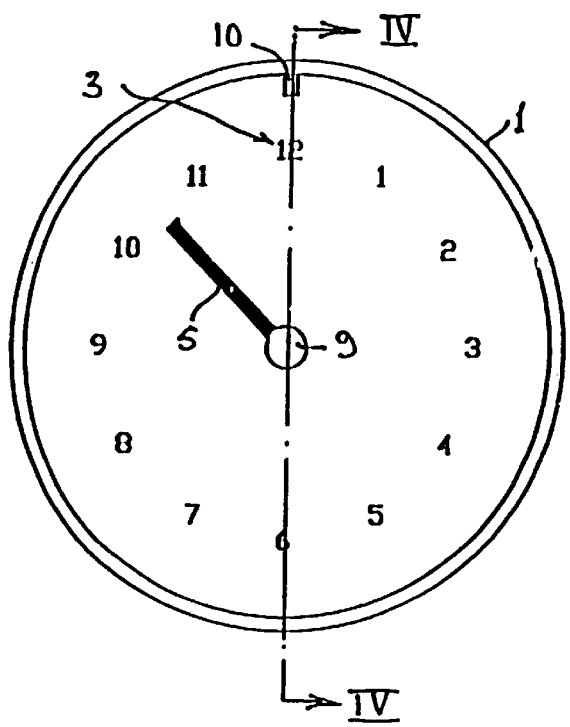
FIG. 3 is a front view of a first element of the device shown in FIG. 1.
Figure 4:
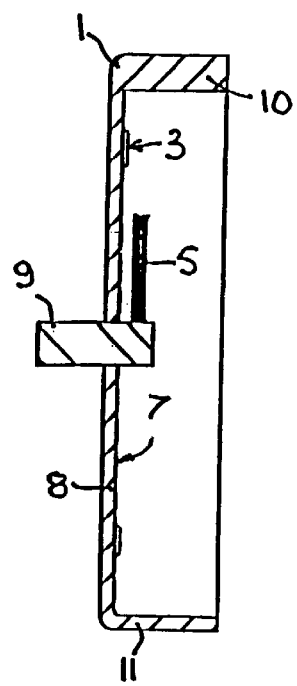
FIG. 4 is a cross-sectional side view of the first element shown in FIG. 3 on the line IV—IV.

As shown in the drawings a teaching device adapted to teach the reading of an analogue clock face comprising a first 1 and second 2 elements, one of which is transparent, in this case this being the element 1 which is marked to represent a clock face displaying hours (indicated by reference numeral 3). The other element, which is the second element 2, is provided with a clock face indicating minute markings (indicated by reference numeral 4). The clock face displaying hours carries a clock hand 5 and that displaying minutes and which is provided on the second element is provided with a clock hand 6. The elements 1 and 2 are provided with means (to be described herein) for removable connection with the hour clock face 3 and the minute clock face 4 superimposed one above the other to display a complete analogue clock face showing hours and minutes and having hour and minute hands. When the two elements are connected together they are as shown in FIGS. 1 and 2.

In the construction shown in the drawings it is the first element 1 which is transparent and carries the clock face displaying hours 3 but if desired the arrangement could be that it was the second component 2 which is transparent and which carries the clock face displaying minutes 4.

The requirements for transparency enable the two clock faces to be seen simultaneously and to view the clock hands. If it was convenient therefore both elements 1 and 2 could be transparent but it will usually only be necessary for one of them to have this characteristic.

Each of the first 1 and second 2 elements carries its respective clock face 3 or 4 on a face surface 7 of a supporting wall 8. When the two elements 1 and 2 are assembled together, as shown in FIGS. 1 and 2, the supporting walls 8 are spaced apart from each other with said face surfaces 7 facing each other, as is most clearly shown in FIG. 2.

From FIG. 1 it will be appreciated that the hour and minute markings are concentric when the two elements are connected together.

Means for manual operation, that is rotating the hour and minute hands 5 and 6, are provided on the surfaces of the supporting wall 7 which face away from each other. In the construction shown the hour hand 5 and minute hand 6 are located at the centre of their respective clock faces on a rotatable knob 9 so that the hands can be rotatably operated from the sides of the supporting walls 7 which face away from each other.

Each of the first and second components are shaped to form a casing when they are removably connected together by conventional means M, as shown in FIG. 2, with the clock faces 3 and 4 and the respective hour and minute hands 5 and 6 within the casing and the means for manual operation, in the form of the knobs 9 for manual operation of the hour and minute hands being outside the casing. The casing is achieved by making the first and second elements of a dish shape with the supporting wall 7 forming the base.

Thus, when the two elements are assembled together the casing is produced.

The two elements 1 and 2 are prevented from rotating relative to each other by means of a tab 10 in the annular wall 11 of the first element 1 and a slot 12 in the annular wall 13 of the second element 2. In the construction being described the elements 1 and 2 are made from a suitable synthetic plastics material so that they are a push fit or friction fit together to define one of many different but equivalent removable connecting means M and the tab 10 and slot 12 ensure that the correct positioning is made. They also serve to mark the midday/midnight position on the clock faces.

If desired the clock face displaying hours 4 together with the hour hand can be in a different colour to the clock face displaying minutes and the minute hand. Thus, for example, the hour face and hand could be coloured blue and the minute face and hand red.

Additionally the face showing the minutes can be divided into two halves along a dividing line extending from the figures 30 to 60. One half can be a different colour to the other to facilitate the teaching of the concept of "to" and "past" the hour. The division line is indicated on FIG. 5 by the reference numeral 14.

Figure 5:
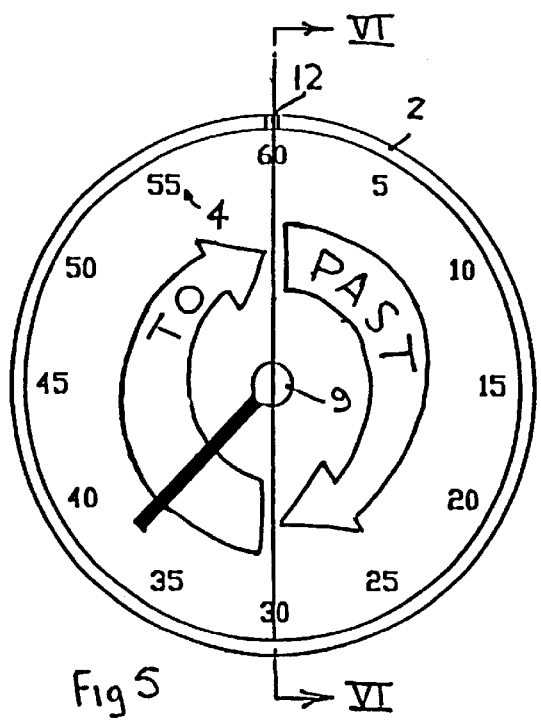
FIG. 5 is a front view of a second element of the device shown in FIG. 1.
Figure 6:
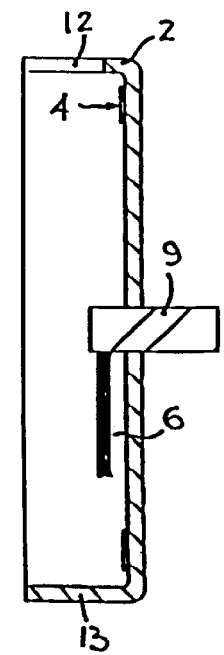
FIG. 6 is a cross-sectional view of the second element shown in FIG. 5 on the line VI—VI.

As shown in FIG. 5 arrows 10 can be included to indicate "to" and "past" the hour.

In order to use the teaching aid it is split into its two elements and is first used to teach the concept of minutes being indicated by the minute hand from the element 2 and is followed by instructing with regard to "to" and "past" the hour. The concept of hours is then introduced by teaching from element 1. Once the principle has been understood the two elements are placed together to produce the complete analogue clock face and the combination of the hour and minute hand is then taught.

It has been found to be considerably easier to teach children the principles of hour and minutes separately and then in combination rather than attempting to teach from the normal analogue clock face in which the hours and minutes are already combined.

Although a preferred embodiment of the invention has been specifically illustrated and described herein, it is to be understood that minor variations may be made in the apparatus without departing from the spirit and scope of the invention, as defined the appended claims.

I claim:

1. A teaching device for teaching the reading of an analog clock face comprising first and second components each of which is transparent, one of said transparent components being marked to represent a clock face displaying minutes and associated therewith being a minute clock hand which is manually rotated from one side of the teaching device, the other of said transparent components being marked to represent a clock face displaying hours and associated therewith being an hour clock hand which is manually rotated from another side of the teaching device, means for removably connecting said first and second transparent components together with said minute and hour clock faces superimposed relative to each other to thereby display a complete analog clock face showing hours and minutes and having respective hour and minute hands, each of said first and second transparent components carrying its respective clock face on a face surface of a supporting wall, said supporting walls being spaced apart from each other with said surfaces facing each other when the first and second transparent components are removably connected together, said respective hour and minute hands being located on said hour and minute clock faces, and individual means for manual operation of the respective hour and minute hands projecting outwardly from the respective supporting walls.

2. The teaching aid as claimed in claim 1 in which the clock face displaying hours and the hour hand are a different color from the clock face displaying minutes and the minute hand.

3. The teaching aid as claimed in claim 1 in which the clock face displaying minutes is marked to indicate "to" and "past" the hour.

4. A teaching aid as claimed in claim 3 in which the halves are indicated by color.

5. A teaching aid as claimed in claim 3 in which the marking to indicate "to" and "past" the hour includes arrows.

6. The teaching aid as claimed in claim 1 in which the clock face displaying minutes is divided into halves along a line extending between numerals thirty and sixty.

7. A teaching device for teaching the reading of an analog clock face comprising first and second components each of which is transparent, one of said transparent components being marked to represent a clock face displaying minutes and associated therewith being a minute clock hand which is manually rotated from one side of the teaching device, the other of said transparent components being marked to represent a clock face displaying hours and associated therewith being an hour clock hand which is manually rotated from another side of the teaching device, means for removably connecting said first and second transparent components together with said minute and hour clock faces superimposed relative to each other to thereby display a complete analog clock face showing hours and minutes and having respective hour and minute hands, each of said first and second transparent components carrying its respective clock face on a face surface of a supporting wall, said supporting walls being spaced apart from each other with said surfaces facing each other when the first and second transparent components are removably connected together, and said first and second transparent components being shaped to form a casing when connected together with the hour and minute clock faces and the respective hour and minute hands located within the casing, and individual means for manual operation of the hour and minute hands being located outside the casing.

8. A teaching device for teaching the reading of an analog clock face comprising first and second components each of which is transparent, one of said transparent components being marked to represent a clock face displaying minutes and associated therewith being a minute clock hand which is manually rotated from one side of the teaching device, the other of said transparent components being marked to represent a clock face displaying hours and associated therewith being an hour clock hand which is manually rotated from another side of the teaching device, means for removably connecting said first and second transparent components together with said minute and hour clock faces superimposed relative to each other to thereby display a complete analog clock face showing hours and minutes and having respective hour and minute hands and, means for preventing relative rotation and ensuring correct relative location of said first and second transparent components.

9. A teaching device for teaching the reading of an analog clock face comprising first and second components each of which is transparent, one of said transparent components being marked to represent a clock face displaying minutes and associated therewith being a minute clock hand which is manually rotated from one side of the teaching device, the other of said transparent components being marked to represent a clock face displaying hours and associated therewith being an hour clock hand which is manually rotated from another side of the teaching device, means for removably connecting said first and second transparent components together with said minute and hour clock faces superimposed relative to each other to thereby display a complete analog clock face showing hours and minutes and having respective hour and minute hands, each of said first and second transparent components carrying its respective clock face on a face surface of a supporting wall, said supporting walls being spaced apart from each other with said surfaces facing each other when the first and second transparent components are removably connected together, said first and second transparent components being shaped to form a casing when connected together with the hour and minute clock faces and respective hour and minute hands located within the casing, and the individual means for manual operation of the hour and minute hands being outside the casing.

* * * * *